April 30, 1963 F. GEIGER 3,087,753
VEHICLE TOP CONSTRUCTION
Filed March 1, 1960 2 Sheets-Sheet 1
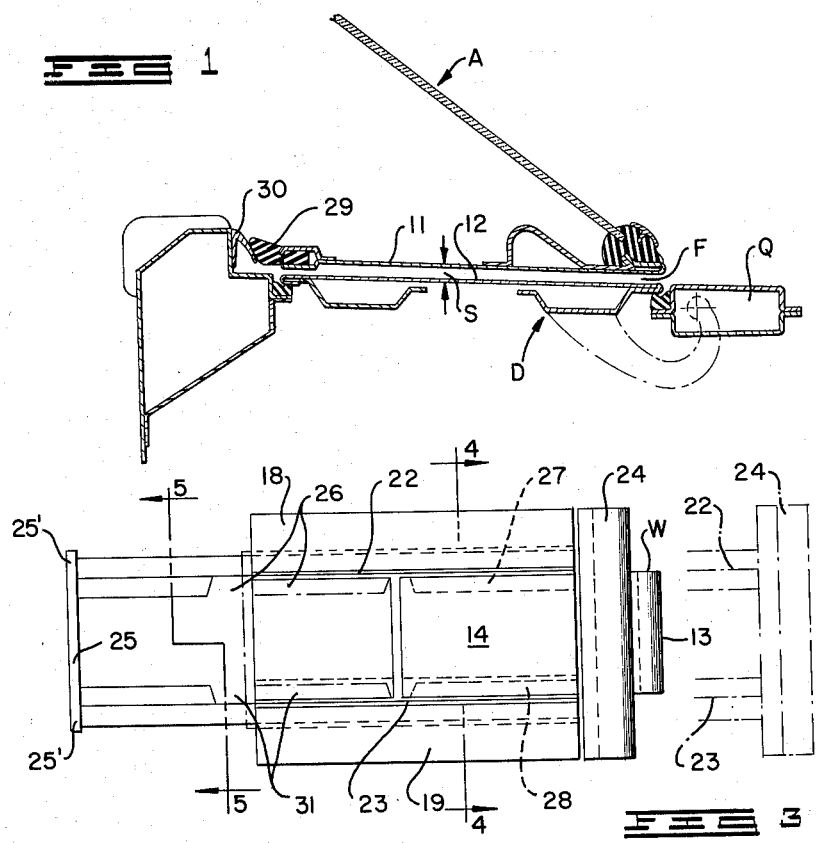
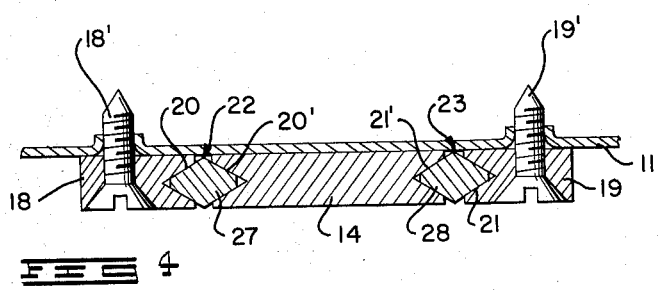
INVENTOR
FRIEDRICH GEIGER
BY *Dicke, Craig & Freudenberg*
ATTORNEYS

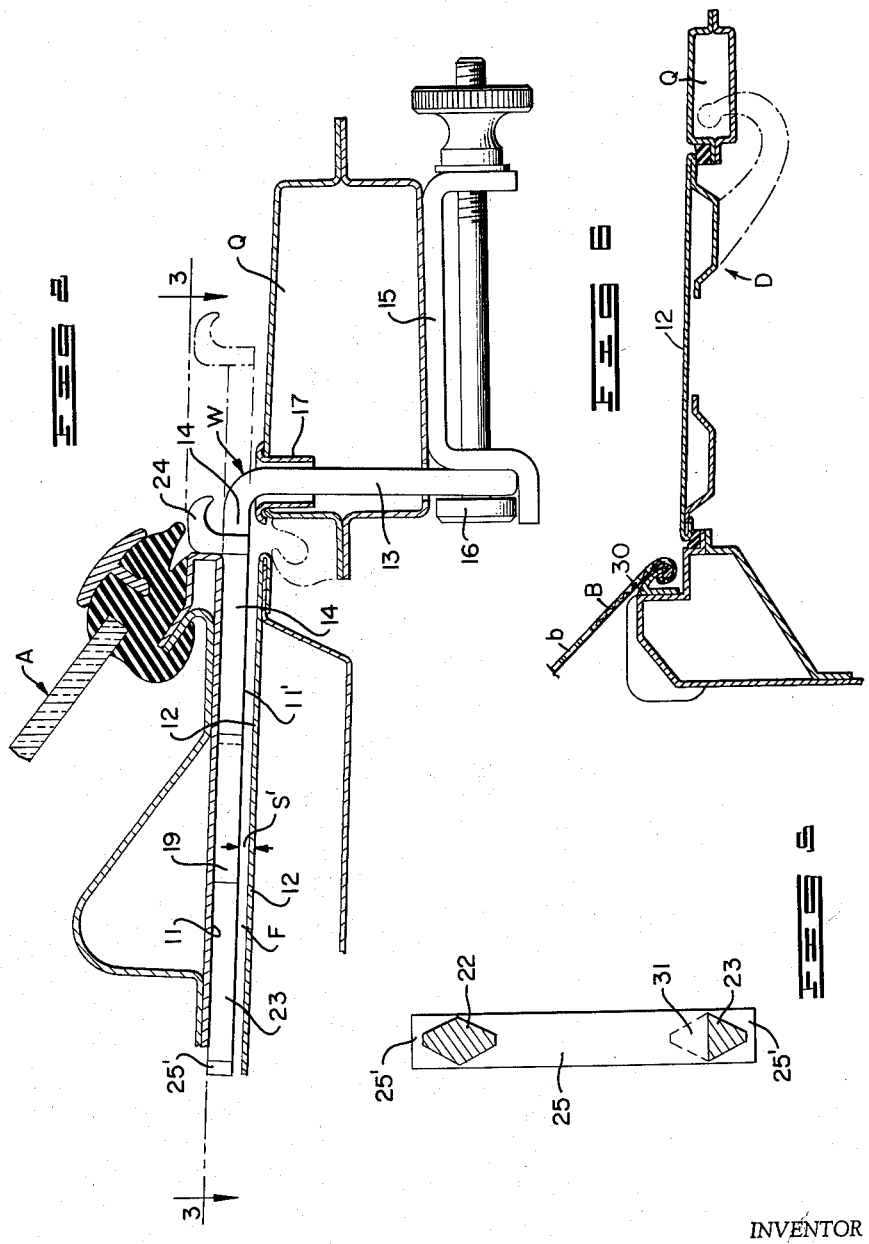

United States Patent Office 3,087,753
Patented Apr. 30, 1963

3,087,753
VEHICLE TOP CONSTRUCTION
Friedrich Geiger, Boblingen, Germany, assignor to Daimler-Benz Aktiengesellschaft, Stuttgart-Unterturkheim, Germany
Filed Mar. 1, 1960, Ser. No. 12,117
Claims priority, application Germany Mar. 6, 1959
14 Claims. (Cl. 296—103)

The present invention relates to the arrangement and support of the rear portion of a removable top at the rear of a motor vehicle, especially of a passenger motor vehicle.

It is known in connection with passenger motor vehicles provided with only one row of seats to equip the same both with a foldable or lowerable roof cover as well as with a so-called hard-top which may be selectively utilized in place of the collapsible or foldable roof cover. In case of use of the hard-top, the foldable roof, folded back upon itself, is thereby disposed in a recessed compartment located behind the back rests of the seats which is adapted to be closed off on top thereof by means of a cover or lid extending essentially parallel with the vehicle superstructure or with the vehicle rear part.

In the known prior art construction, the securing of the rear portion of the hard top at the vehicle superstructure or at the vehicle rear part takes place either laterally at the upper end of the door columns with the aid of locking mechanisms or by means of bolt members along the lower rear edge of the top so that the top rests thereat directly on the vehicle superstructure with the interposition of a rubber seal. However, with a relatively long-lasting abutment of the seal, for example, sometimes for several months during the winter season, there arises the disadvantage that the polish of the body paint suffers in this place and a mat edge strip, unpleasing to the eye of an observer results therefrom during subsequent use of the foldable roof, the rear end of which usually does not extend as far rearwardly as the rear end of the hard-top.

In order to avoid these disadvantages, it is proposed in accordance with the present invention to provide between the downwardly directed seating surface of the rear portion of the roof top and the upper surface of the vehicle superstructure a gap disposed therebetween and having a slight width which is open toward the outside thereof.

In order to achieve an effective seal of the vehicle interior space with respect to the atmosphere, notwithstanding this intermediate free space or gap, it is proposed in accordance with a further feature of the present invention to arrange at the inwardly directed edge of the seating surface of the hard-top a seal which abuts only against a ledge member secured to the vehicle superstructure, preferably against the anchoring ledge member present for the rear lower rim of the foldable roof so that dust and dampness cannot penetrate into the passenger space notwithstanding the otherwise open gap.

It is further proposed pursuant to another feature of the present invention to support the rear portion of the hard-top exclusively at individual places, preferably at two places, at the vehicle superstructure by means of separate intermediate members which are also exposed freely with respect to the surface of the vehicle superstructure or with respect to the vehicle rear part.

According to a further development of this last feature, it is additionally proposed in accordance with the present invention to simultaneously utilize the separate intermediate members for securing the rear portion of the top and, for that purpose, to construct the same as a locking mechanism.

Accordingly, it is an object of the present invention to provide an arrangement for supporting a removable hardtop in passenger motor vehicles which obviates the disadvantages and inadequacies encountered in connection with the prior art constructions.

It is still another object of the present invention to provide a support and securing arrangement for a removable hard-top which may be selectively installed in the place of a foldable roof, which provides a good seal for the passenger interior space against the outside of the vehicle, especially as regards dust, dirt, dampness and humidity, and which is simple in structure, reliable in operation, easy to handle during installation and removal, and relatively inexpensive in manufacture and assembly thereof.

A still further object of the present invention resides in the provision of an elastic seal for a removable hard top of a passenger motor vehicle in which the support and of a passenger motor vehicle in which the support and locking mechanism are simple and completely satisfactory for the intended purposes.

These and other objects, features and advantages of the present invention will become more obvious from the following description when taken in connection with the accompanying drawing which shows for purposes of illustration only, one embodiment in accordance with the present invention, and wherein FIGURE 1 is a longitudinal cross-sectional view through the rear portion of a removable hard-top taken between two supporting places, FIGURE 2 is a longitudinal cross-sectional view, on an enlarged scale, also through the rear portion of a removable hard-top taken within the area of a supporting place, FIGURE 3 is a cross-sectional view taken along line 3—3 of FIGURE 2, FIGURE 4 is a cross-sectional view, on an enlarged scale, taken along 4—4 of FIGURE 3, FIGURE 5 is a cross-sectional view, also on an enlarged scale, taken along line 5—5 of FIGURE 3, and FIGURE 6 is a longitudinal cross-sectional view similar to FIGURE 1 but showing the flexible roof in operative position.

Referring now to the drawing wherein like reference numerals are used throughout the various views to designate like parts, and more particularly to FIGURE 1, reference numeral 11 designates therein the seating surface of the rear portion or the transverse lower wall of the removable hard-top generally designated by reference character A while reference numeral 12 designates the upper surface of the vehicle superstructure, which in the case of FIGURE 1 is the upper surface of a pivotally secured closure lid generally designated by reference character D. As is clearly visible from FIGURE 1, an open gap or joint F having a relatively slight height s remains between the seating surface 11 of the rear portion of the removable top A and the surface 12 of the vehicle superstructure. The rear portion of the hard-top A is supported with respect to the vehicle superstructure, for example, with respect to the box shaped transverse bearer member Q thereof disposed ahead of the luggage space, at individual places, preferably at two places by means of special intermediate members. Supporting angle irons W (FIGURE 2) are provided as special intermediate members one leg portion 13 of which extends downwardly whereas the other leg portion 14 thereof extends essentially horizontally (FIGURES 2, 3 and 4). The lower end of the leg portion 13 is rigidly connected by means of a head bolt member 16 (FIGURE 2) with the vehicle superstructure, for instance with the transverse crossbearer member Q thereof through an angularly bent member or angle iron 15 itself suitably secured, for instance by welding, at the cross-bearer member Q.

The upper part of the vertically extending leg portion 13 is retained within a bushing 17 (FIGURE 2) secured at the cross-bearer member Q. A gap s' (FIGURE 2) also remains between the underside 11' of the horizontally extending leg portion 14 and the surface 12 of the vehicle superstructure so that the rear portion of the top A, i.e. the underside 11 thereof does not rest directly at any place on the surface 12 of the vehicle superstructure. Instead, the rear portion of the top A rests exclusively on the leg portions 14 of the angle irons W.

The places on which the rear portion of the top A is supported, are simultaneously constructed as locking mechanisms in accordance with the present invention. For that purpose, outer ledge members 18 and 19 are secured, for example, by metal screws 18' and 19' at the underside 11 of the top A (FIGURE 4) which together with the leg portion 14 of the angle iron W disposed therebetween form essentially diamond-shaped guide apertures 20, 20' and 21, 21'. Slide members generally designated by reference numerals 22 and 23 (FIGURES 2, 3, 4 and 5) slide within the guide portions 20, 20' and 21, 21', respectively, which guide members 22 and 23 are connected with each other along the outer ends thereof by means of a common handle 24. The inner ends of the slide members 22 and 23 are also connected with each other by an abutment ledge 25. The slide members 22 and 23 which are essentially diamond shaped in cross-section slide with the outer diamond halves within the guide halves 20 and 21 provided in the ledge members 18 and 19 whereas the inner diamond halves of the slide members 22 and 23 slide within the guide portions 20' and 21' of the leg portion 14. The inner diamond halves of the slide members 22 and 23 are provided within the center region of the sliding length thereof with recesses 26 and 31 (FIGURES 3 and 5) which have approximately half the length of the outer ledge members 18 and 19.

In the fully pushed-in position of the slide members 22 and 23, the part 27 and 28 of the inner diamond halves of the slide members 22 and 23 engage into the guide portions 20' and 21' of the leg portion 14. In the pulled-out position of the slide members 22 and 23, the recesses 26 and 31 reach the area of the guide halves 20' and 21' of the leg portion 14 so that the rear portion of the top A is effectively unlocked thereby and may then be lifted. The outer corners 25' (FIGURE 5) of the ledge member 25 form abutments which abut in the pulled-out position of the slide members 22 and 23 against the outer ledge members 18 and 19.

A seal 29 (FIGURE 1) is provided at the edge of the seating surface 11 of the rear portion of the top A which is directed toward the vehicle interior space and which seal 29 abuts against the anchoring ledge member 30 of hook shaped cross-section which with the removable top A removed serves for securing the lower rim of a foldable roof cover B (FIGURE 6) which has the usual rear window b.

In order to prevent accidental or unauthorized unlocking of the locking mechanism for the hard-top in accordance with the present invention by pulling-out the handle 24 interconnecting the slide members 22 and 23, any suitable clamping, securing or retainer means may be provided, accessible only from within the vehicle, which prevents the outward sliding movement of the assembly 25, 22, 23 and 24 toward the right as viewed in FIGURE 3. Such means may be in the form of a spring-loaded latch detent, hook, pin or the like adapted to project into the path, for instance, of the ledge member 25 or of one or both abutment surfaces 25' and adapted to be withdrawn manually, for instance, by a Bowden cable or by any other suitable electric, pneumatic or hydraulic actuating mechanism.

While I have shown and described one embodiment in accordance with the present invention, it is understood that the same is not limited thereto but is susceptible of many changes and modifications within the spirit and scope of the present invention, and I therefore do not wish to be limited to the details shown and described herein but intend to cover all such changes and modifications as are encompassed by the scope of the appended claims.

I claim:

1. A support arrangement for the rear portion of a removable top at the rear of a motor vehicle having a vehicle superstructure, comprising a substantially rigid, removable top provided with downwardly directed seating surface means in the rear portion thereof, said vehicle superstructure being provided with upper surface means, support means supporting said top on said vehicle superstructure to provide a gap having a slight width which is opened toward the exterior of said motor vehicle between said seating surface means and said vehicle superstructure upper surface means, said support means including a plurality of intermediate members also spaced from said upper surface means of the vehicle superstructure for supporting said top only at predetermined individual places, said intermediate members effectively constituting a locking mechanism for removably securing the rear portion of said top on said vehicle superstructure, said locking mechanism including two outer ledge members secured to said top, angularly bent support means having two leg portions and forming part of said support means, one of said leg portions being rigidly secured to said vehicle superstructure and the other leg portion forming together with said ledge members guide means, and slidable members adapted to be slidingly received within said guide means and effective as bolt members for detachably securing the rear portion of said top on said vehicle superstructure.

2. A support arrangement for the rear portion of a removable top according to claim 1, wherein said vehicle superstructure includes a cross-bearer member provided with a bushing, and wherein said one leg portion extends through said bushing, said bushing having a width and length corresponding essentially to said one leg portion, and further comprising detachable connecting means for detachably securing the lower end of said one leg portion with said vehicle superstructure.

3. A support arrangement for the rear portion of a removable top according to claim 2, further comprising an angle iron rigidly secured with said cross-bearer member which is disposed forwardly of the rear compartment of the vehicle, said one leg portion being supported rearwardly thereof against said angle iron, and bolt means for detachably connecting together said angle iron and said one leg portion.

4. A support arrangement for the rear portion of a removable top at the rear of a motor vehicle having a vehicle superstructure, comprising a top provided with downwardly directed seating surface means in the rear portion thereof and with two ledge members, said vehicle superstructure being provided with upper surface means, and support means normally supporting said top on said superstructure to provide a gap having a slight width which is open toward the outside and is provided between said seating surface means and said upper surface means including intermediate support means also spaced from said upper surface means and effectively constituting a locking mechanism for said removable top, said intermediate support means being provided with a support portion extending within the area of said ledge members, both said ledge members and said support portion being provided with complementary guide means; two slide members slidingly received within said guide means and of corresponding shape to detachably secure said top to said superstructure upon insertion of said sliding members within said guide means.

5. A support arrangement for the rear portion of a removable top according to claim 4, wherein said guide means as well as said slide members are approximately diamond-shaped, the outer diamond halves being supported respectively in the guide means formed in said ledge members whereas the inner diamond halves of said slide members are supported within the guide means of said support portion, the inner diamond halves of said slide members being provided within the center area of the slide length thereof with cut-out portions having a length corresponding approximately to the length of said support portion and being so disposed in relation to said support portion that in the inserted condition of said slide members said cut-out portions begin outside the inner end of said support portion whereas in the pulled-out condition of said slide members said cut-out portions are disposed within the area of said supporting portion.

6. A support arrangement for the rear portion of a removable top according to claim 4, wherein said two slide members include a common handle along the outer part thereof rigidly connecting said slide members with each other.

7. A support arrangement for the rear portion of a removable top according to claim 4, further comprising a transverse ledge member connecting the inner ends of said slide members with each other, said transverse ledge member having projecting outer edge portions forming together with said ledge members abutments in the pulled-out condition of said slide members.

8. A support arrangement for the rear portion of a removable top according to claim 4, wherein said top is locked to said intermediate support means with said slide members in the inserted condition thereof.

9. A support arrangement for the rear portion of a removable top at the rear of a motor vehicle having a vehicle superstructure, comprising a top provided with rear wall means extending transversely to said vehicle superstructure and with downwardly directed seating surface means in the rear portion thereof, said vehicle superstructure being provided with upper surface means, and support means including intermediate support means for supporting said top on said superstructure at a plurality of spaced places in such a manner as to provide a small gap between said seating surface means and said upper surface means of the vehicle superstructure while simultaneously therewith also spacing said intermediate support means from said upper surface means, said intermediate support means constituting a bolting mechanism for detachably securing the rear portion of said top on said vehicle superstructure and including angle iron means including two leg portions, one of said leg portions being secured to said vehicle superstructure, ledge means secured to said top, the other leg portion and said ledge means being provided with complementary recesses effectively forming guide means, and sliding means securing said other leg portion to said ledge means upon insertion of said slide means into said guide means to thereby removable secure the rear portion of said top to said vehicle superstructure.

10. A support arrangement for the rear portion of a removable top at the rear of a motor vehicle having upper body surface means, comprising a rigid top provided with rear wall means extending transversely of said vehicle and including essentially horizontal lower wall means, and support means including intermediate support means for supporting said top upon said upper body surface means at a plurality of spaced places to provide a small gap between said lower wall means and said upper body surface means open to the rear of the vehicle while simultaneously therewith also spacing said intermediate support means from said upper body surface means, said intermediate support means including a pair of angularly bent support rod members each having two leg portions, one of the leg portions of each support rod member detachably supporting thereon said lower wall means of said top and the other leg portion extending through said upper body surface means, and means detachably connecting the lower end of said other leg portions beneath said upper body surface means.

11. In a motor vehicle having a removable, flexible top, securing means adapted to engage the rear portion of said flexible top in the raised position thereof, an essentially rigid top to replace said flexible top, said vehicle having upper body surface means, said essentially rigid top having generally horizontal lower wall means extending rearwardly beyond said securing means for the flexible top, and support means supporting said essentially rigid top above said upper body surface means to provide a substantially unobstructed gap having a slight width which is open towards the rear of said vehicle between said lower wall means of said essentially rigid top and said upper body surface means.

12. In a motor vehicle having a removable, flexible top, securing means adapted to engage the rear portion of said flexible top in a raised position thereof, an essentially rigid top to replace said flexible top, said vehicle having upper body surface means rearwardly of said securing means, said essentially rigid top extending rearwardly beyond said securing means and including lower transverse wall means extending essentially parallel to said upper body surface means, support means supporting said essentially rigid top above said upper body surface means to provide a substantially unobstructed gap of slight width which is open toward the rear of said vehicle between said seating surface means and said lower wall means, and sealing means secured to said lower wall means and engaging said securing means for the flexible top.

13. In a motor vehicle having a removable flexible top, securing means adapted to engage the rear portions of said flexible top in the raised position thereof, an essentially rigid top to replace said flexible top, said vehicle having upper body surface means, said essentially rigid top having generally horizontal lower wall means extending rearwardly beyond said securing means for the flexible top, and support means supporting said essentially rigid top above said upper body surface means to provide a substantially unobstructed gap having a slight width which is open towards the rear of said vehicle between said lower wall means of said essentially rigid top and said upper body surface means, said support means including a plurality of spaced, intermediate rod members having essentially horizontally extending leg portions spaced from said upper body surface means and in operative engagement with said lower wall means.

14. In a motor vehicle having a removable, flexible top, securing means including downwardly inclined ledge means extending transversely across the vehicle to engage a rear portion of said flexible top in a raised position thereof, an essentially rigid top to replace said flexible top, said vehicle having upper body surface means rearwardly of said securing means, said essentially rigid top extending rearwardly beyond said securing means and having transverse lower wall means, support means supporting said essentially rigid top above said upper body surface means to provide a substantially unobstructed gap of slight width which is open toward the rear of said vehicle between said lower wall means of said essentially rigid top and said seating surface means, and transversely extending sealing means secured to said lower wall means and engaging said securing means for the flexible top.

References Cited in the file of this patent

UNITED STATES PATENTS

| 1,321,389 | Paradis et al. | Nov. 11, 1919 |
| 1,778,356 | Coppock | Oct. 14, 1930 |
| 2,046,574 | Olivier | July 7, 1936 |
| 2,511,460 | Cancelli et al. | June 13, 1950 |

FOREIGN PATENTS

| 463,414 | France | Feb. 23, 1914 |
| 460,246 | Germany | May 23, 1929 |